US007127745B1

(12) United States Patent
Herse et al.

(10) Patent No.: US 7,127,745 B1
(45) Date of Patent: Oct. 24, 2006

(54) METHOD OF CONTROLLING ACCESS FOR SOFTWARE DEVELOPMENT VIA A VIRTUAL COMMON DESKTOP WITH PLURAL VIEWERS

(75) Inventors: Conrad M. Herse, Naperville, IL (US); Joseph P. Rekiere, Tinton Falls, NJ (US); Henry L. Voss, Elmhurst, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/536,084

(22) Filed: Mar. 24, 2000

(51) Int. Cl.
*G06F 9/00* (2006.01)
*H04L 9/00* (2006.01)

(52) U.S. Cl. .................. 726/30; 726/29; 726/28; 726/15

(58) Field of Classification Search ............. 713/201, 713/200, 202; 709/205
See application file for complete search history.

(56) References Cited

U.S. PATENT DOCUMENTS

| 4,825,354 | A | | 4/1989 | Agrawal et al. ............ 364/200 |
| 5,457,797 | A | * | 10/1995 | Butterworth et al. ....... 719/320 |
| 5,603,019 | A | * | 2/1997 | Kish .......................... 707/205 |
| 5,737,523 | A | | 4/1998 | Callaghan et al. ..... 395/200.55 |
| 5,828,833 | A | | 10/1998 | Belville et al. ......... 395/187.01 |
| 5,872,923 | A | * | 2/1999 | Schwartz et al. ........... 709/205 |
| 6,374,290 | B1 | * | 4/2002 | Scharber et al. ........... 709/205 |
| 6,571,245 | B1 | * | 5/2003 | Huang et al. ................ 707/10 |
| 6,584,493 | B1 | * | 6/2003 | Butler ........................ 709/204 |
| 6,650,747 | B1 | * | 11/2003 | Bala et al. ............. 379/265.06 |
| 6,694,309 | B1 | * | 2/2004 | Cho et al. ...................... 707/3 |
| 6,754,677 | B1 | * | 6/2004 | Cho et al. .................. 707/201 |
| 2002/0091697 | A1 | * | 7/2002 | Huang et al. ................. 707/10 |
| 2003/0033401 | A1 | * | 2/2003 | Poisson et al. ............. 709/224 |

OTHER PUBLICATIONS

"Virtual Network Computing," by T. Richardson, Q. Stafford-Fraser K. R. Wood and A. Hopper, *IEEE Internet Computing*, vol. 2, No. 1—Jan./Feb. 1998.

* cited by examiner

*Primary Examiner*—Norman M. Wright (57) ABSTRACT

In a virtual network computing (VNC) system wherein multiple users, or viewers, at different locations share a common desktop computer for the purpose of sharing control of software applications, the VNCSESSION owner exercises dynamic Internet protocol (IP)-based control over access of the viewers to the server associated with the shared desktop. The VNCSESSION owner is defined as the user who initiates the server and the first viewer to connect to the desktop. The session owner is given full access to the desktop, i.e., active access permitting the viewer to exercise control over the application. For the remaining connected viewers, only VNCVIEWERS having their IP address present in a VNC security file containing authorized IP addresses can initiate activity on the desktop, or exercise control over the application. All other connected viewers may only review desktop activity initiated by other viewers, but cannot initiate such activity themselves, i.e., cannot exercise control over the application. The session owner can dynamically specify, on a per viewer basis as well as on a per session basis, the level of access, passive or active, of each subsequent viewer. The status of each viewer, the number of viewers connected to the desktop from a given IP address, and active/passive selectors for all connected viewers are presented on a video display for review by the session owner.

15 Claims, 5 Drawing Sheets

FIG. 8

METHOD OF CONTROLLING ACCESS FOR SOFTWARE DEVELOPMENT VIA A VIRTUAL COMMON DESKTOP WITH PLURAL VIEWERS

FIELD OF THE INVENTION

This invention relates generally to computer networks and is particularly directed to the exercise of control over viewer access to a common desktop computer for the purpose of sharing control of software applications in a virtual network computing arrangement.

BACKGROUND OF THE INVENTION

Virtual network computing (VNC) enables multiple users at different locations to share a common desktop computer for the purpose of sharing control of software applications. VNC allows two users at different locations to view the same desktop and exercise control over the software applications that were started in the shared desktop. Within the shared desktop, each user is able to observe the mouse and keyboard actions of all other participating users as changes are made to the software application. VNC has proven to be a useful tool during design/debug sessions where each participant brings his or her own expertise to the debug process. For example, one participant may bring to the session hardware simulation expertise, while another participant may contribute software expertise in debugging a software application. VNC is also useful in updating documentation created by multiple authors. Each author, while at his or her own work station, can update the same document, while reviewing the updates of other contributing authors. The ability to share a desktop at remote locations is thus extremely useful and efficient in the development of software applications in terms of saving time, money and travel, as the participating users do not have to be physically present at one location to share the desktop computer.

In general, VNC employs two components: a server and a viewer. The server runs on a host machine which includes a desktop and is started by a user located at the host machine. A viewer uses a remote machine, with a viewer session started by a user at the remote machine. The user that initially starts the server is the server owner. All activity in the desktop is done using the computer ID of the server owner. Viewers that subsequently connect into the session are provided active access. All active viewers have the same control over applications within a given server and are run under the computer ID of the server owner.

A server owner must be alert to the activities of the other viewers participating in the shared desktop. Because all active viewers can start, stop and control software applications as if these inputs originated with the server owner, it is highly desirable to exercise security measures to protect the applications from unauthorized operations of other viewers. While current VNC versions allow multiple users to share a desktop, none protect a server owner from unauthorized users exploiting the desktop's server when their activities are not being observed by the server owner.

The present invention addresses the aforementioned limitations of the prior art by allowing the server owner of a VNC arrangement to dynamically assign each VNC viewer either passive status wherein the viewer may only observe the desktop activities of other viewers or active status wherein the viewer may exercise control over a software application.

SUMMARY OF THE INVENTION

The present invention contemplates a VNC arrangement which allows multiple users, or viewers, to share a desktop computer with the extent of access of each viewer determined by the server owner. The server owner creates an "VNCSESSION", which the server owner owns and which is comprised of a server and a viewer for the server owner. The IP address of each subsequent viewer is compared to the contents of a file provided by the session owner to determine if the viewer is to be accorded "passive" or "active" status. If the viewer's IP address is stored in the file, the viewer is accorded active status and is allowed to initiate activity in the desktop such as making changes to software applications in the desktop. If the viewer's IP address is not present in the file the viewer is accorded only passive status, limiting the viewer's participation to merely observing the actions of other active viewers including the actions of the session owner. The present invention allows the session owner to create and maintain access control to the desktop's server on a per viewer and per session basis. Information such as the IP address, logical machine name of a VNC viewer which connects to the desktop, and connected viewer status (active/passive) is provided on a video display for viewing by the session owner. Also presented on the video display for viewing by the session owner is such information as when a viewer disconnects from the desktop and the number of viewers connected to the desktop from a given IP address. The present invention allows the session owner to use the video display to change the status of any connected viewer, and further provides auditing and VNC logfile monitoring of the desktop server for errors and insensitivities and notifies the session owner when problems are detected. An audio "beep" is also provided to notify the session owner whenever a viewer connects or disconnects from the VNC session.

BRIEF DESCRIPTION OF THE DRAWINGS

The appended claims set forth those novel features which characterizes the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
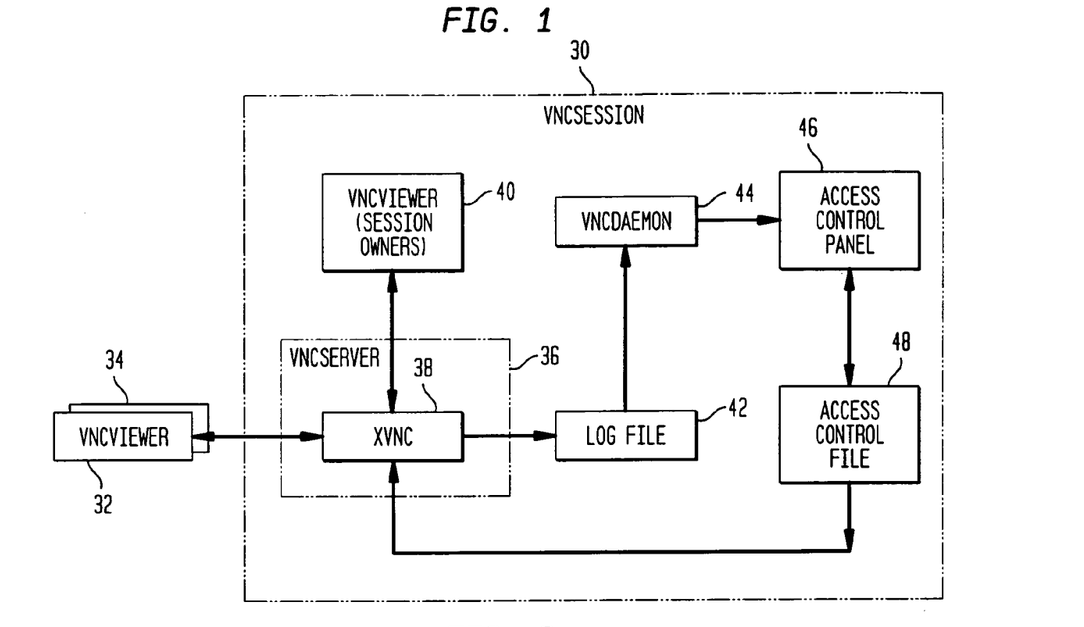
FIG. 1 is a simplified combined schematic and block diagram of a computer network in which the dynamic Internet protocol (IP)-based control of virtual computing applications of the present invention is intended for use.

Referring to FIG. 1, there is shown in simplified combined schematic and block diagram form a virtual network computing (VNC) system 10 in which the present invention is intended for use. VNC system 10 includes first, second, third and fourth desktop computers 14, 16, 18, and 20. While the VNC system 10 is shown as including four desktops, the VNC system with which the present invention is intended for use may incorporate virtually any number of desktop computers. Each desktop computer includes a video display, or monitor, and a central processor unit, as is conventional. Each of the desktop computers also includes a server, where a server 12 of the first desktop computer 14 is shown in FIG. 1. It is on the first desktop computer 14 that a VNCSESSION is initiated by the operator of the first desktop computer, who is hereinafter referred to as the "session owner". Server 12 is typically incorporated in the first desktop computer 14, but is shown as a separate block in FIG. 1 to illustrate that the second, third and fourth desktop computers 16, 18 and 20 gain access to the VNCSESSION through the server 12 of the first desktop computer 14.

Figure 2:
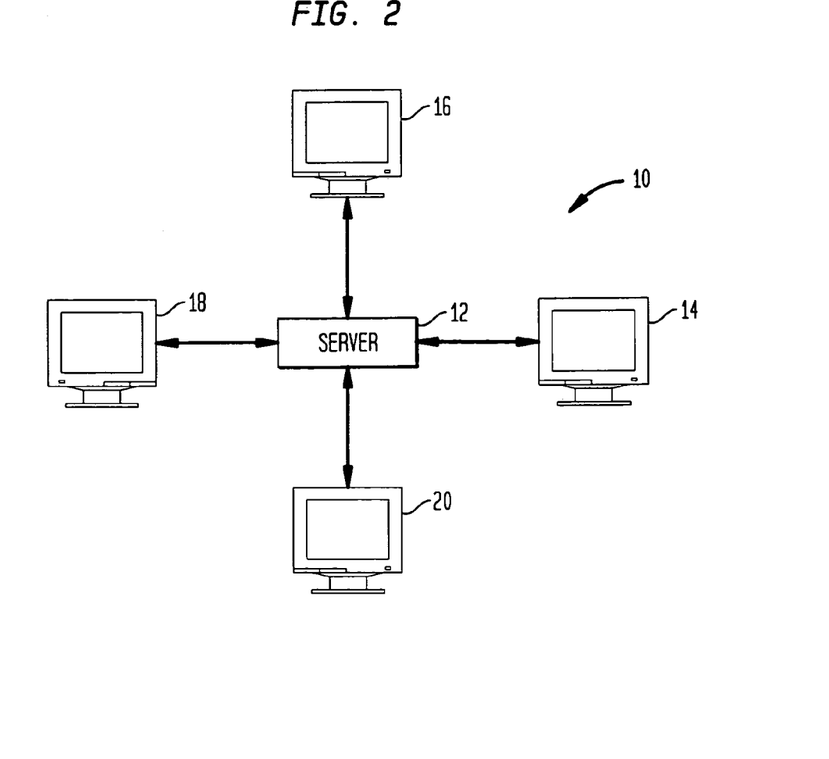
FIG. 2 is a conceptual illustration in block diagram form of the dynamic IP-based control of virtual computing applications of the present invention.

Referring to FIG. 2, there is shown a conceptional illustration in block diagram form of the dynamic Internet Protocol (IP)-based control of virtual computing applications of the present invention. Each of the blocks shown in FIG. 2 represents either a software application or a data file of the VNC system. The figure shows the relationship between the various software applications and files in carrying out the dynamic IP-based control of virtual computing applications of the present invention.

VNCSESSION 30 is a software application employed by a user wishing to start an interactive desktop session. In the following description, the terms "user" and "viewer" are assigned the same meaning and are used interchangeably. VNCSESSION 30 creates the server and VNC session owner's viewer on the same desktop, or machine. The user wishing to start the interactive desktop session is the owner of the desktop and is also termed hereinafter as the owner of the VNCSESSION. The owner of the VNCSESSION 30 determines the desktop password for accessing the VNC session as well as the access mode, either active or passive, for each of the VNCVIEWERS 32 and 34 who connect to the desktop. FIG. 2 shows only two VNCVIEWERS 32 and 34, however, the dynamic IP-based control of virtual computing applications of the present invention may be utilized with virtually any number of viewers, or users. VNCVIEWERS 32, 34 connected to the desktop operate in the session owner's desktop under the user identification (USERID) of the VNCSESSION owner.

The organization of the software applications and data files shown in FIG. 2 will now be further described with respect to FIGS. 3–6, which are simplified flow charts illustrating the series of steps carried out in each of the software applications shown in FIG. 2.

Figure 3:
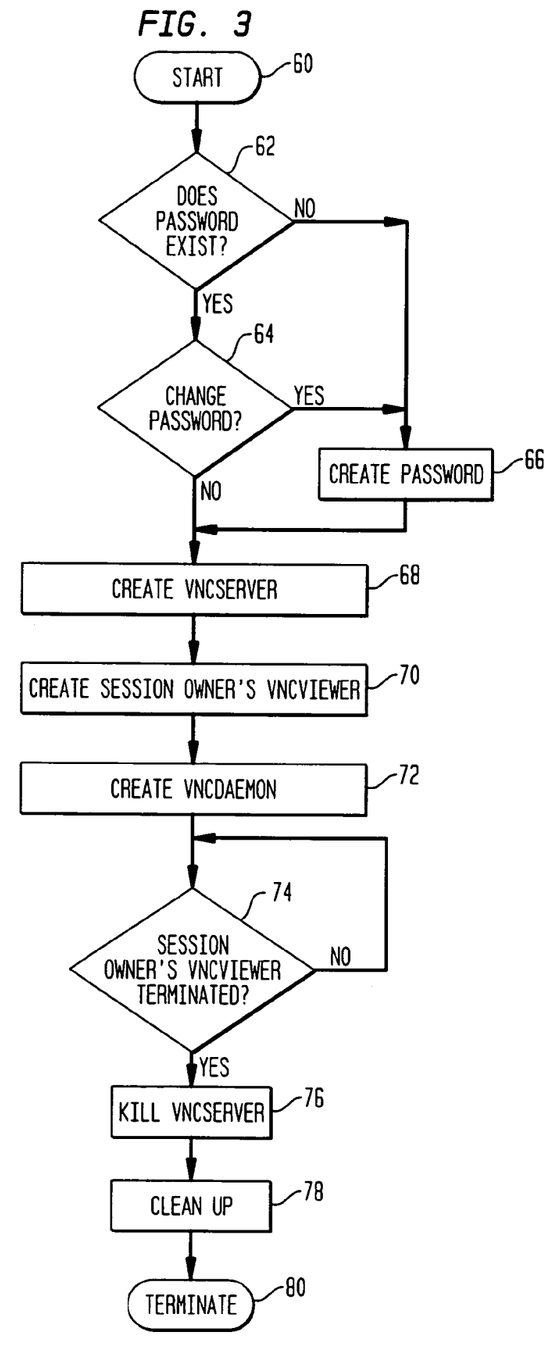
FIG. 3 is a simplified flow chart illustrating the sequence of steps involved in implementing a viewer interactive desktop VNCSESSION in accordance with the principles of the present invention.
Figure 6:
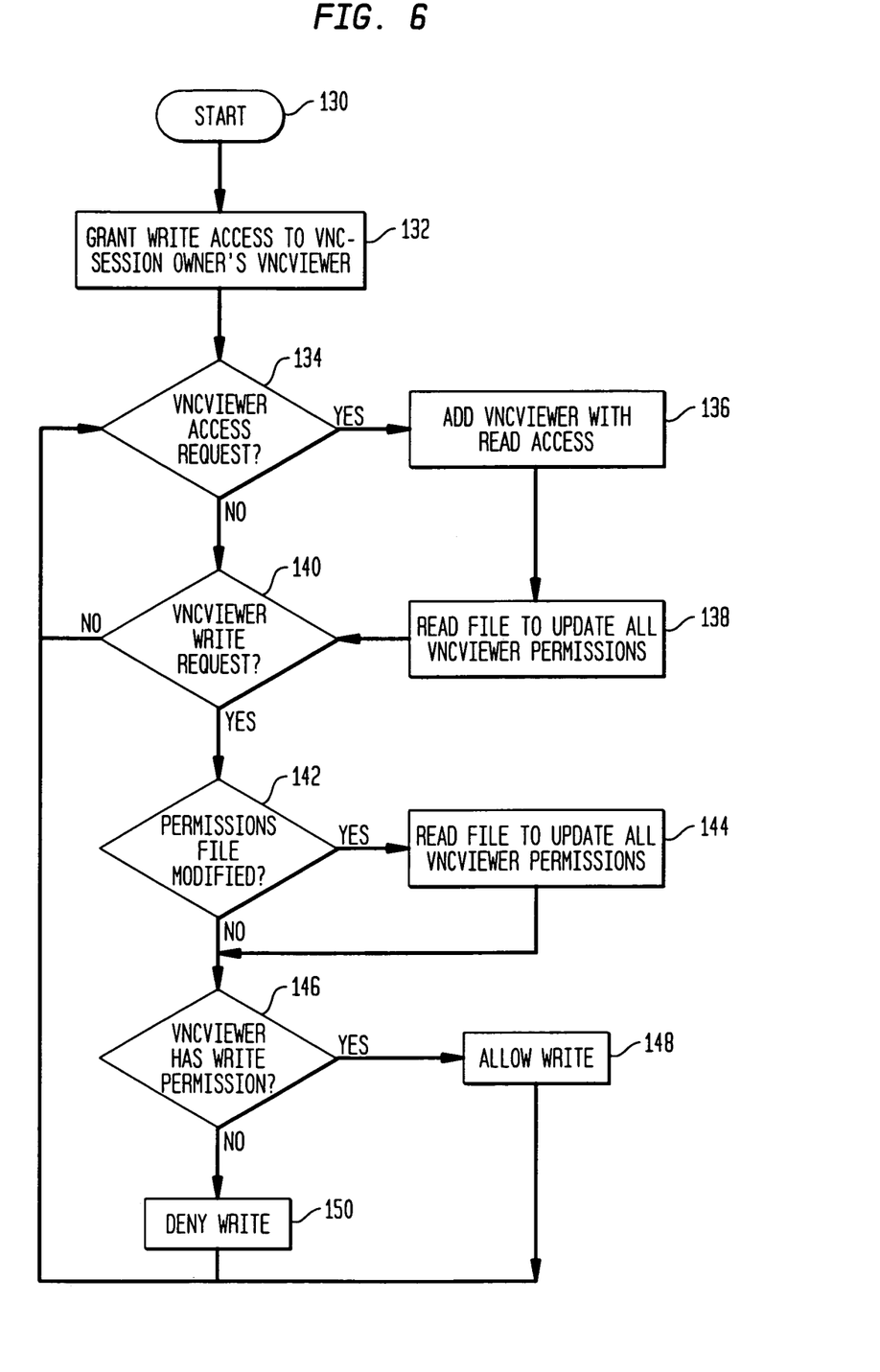
FIG. 6 is a simplified flow chart illustrating the sequence of steps involved in granting either passive or active access to a viewer of a VNCSESSION by the VNCSESSION owner.

With reference also to FIG. 3, there is shown a simplified flow chart illustrating the sequence of steps involved in implementing a viewer interactive desktop VNCSESSION 30 in accordance with the principles of the present invention. After invoking VNCSESSION, the session owner is first offered the opportunity to specify the VNCSESSION password to be used for gaining access to the desktop. Thus, the VNCSESSION application is initiated by the session owner at step 60, followed by a determination by the program of the existence of a password at step 62. If the session owner has previously selected and entered a password, the program proceeds to step 64 and permits the session owner to change the password, if desired, by proceeding to step 66. If a password has not previously been selected and entered by the session owner, the program proceeds from step 62 to step 66 and permits the session owner to create a password. In either case, the program then proceeds to step 68 and creates the VNCSERVER application 36 which, in turn, creates the security enhanced XVNC application 38 which is shown in FIG. 6 and described in detail below.

The VNCSESSION application also creates a VNCVIEWER session 40 at step 70 for the session owner, which establishes a connection to VNCSERVER 36. Termination of the session owner's VNCVIEWER 40 results in termination of all initiated processes, and particularly the XVNC application, and an end to the VNCSESSION. Terminating all initiated processes prevents unauthorized user access to the VNCSESSION 30. In addition to creating the VNCSERVER and XVNC applications, VNCSESSION also creates a VNCDAEMON application 44 and a VNC Access Control Panel application 46 as shown in FIG. 2. VNCDAEMON 44 monitors for VNCVIEWERS requesting to establish connection with the VNCSESSION. This monitoring is done by reading entries in a log file 42 posted by the XVNC application 42. More specifically, VNCDAEMON 44 looks for VNCVIEWER connect and disconnect messages. When these messages are generated, VNCDAEMON 44 signals the Access Control Panel 46 to update a Graphical User Interface (GUI) display based on VNCVIEWER activity as described below.

Figure 7:
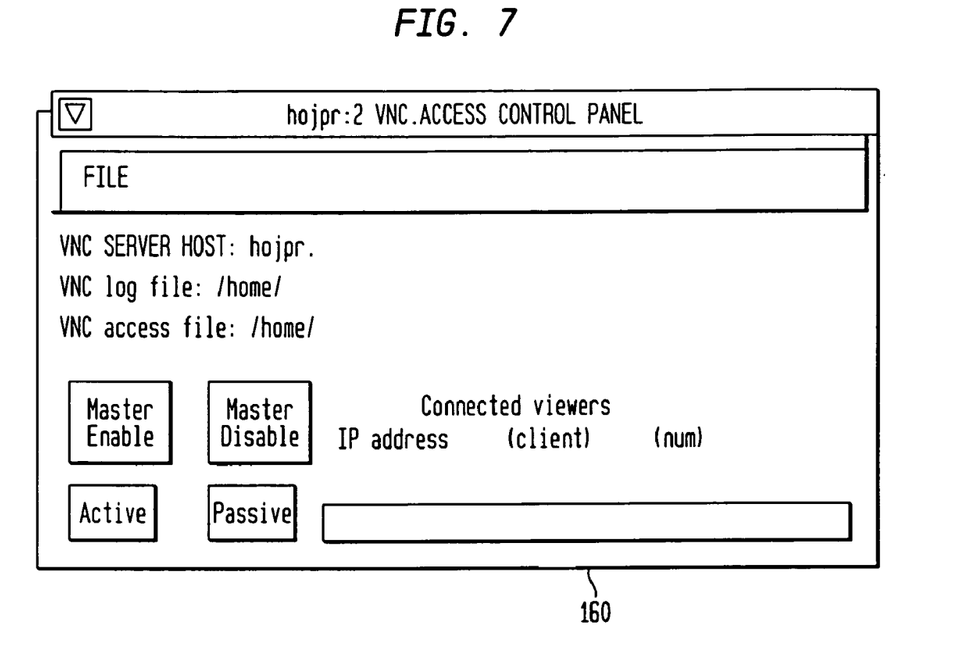
FIGS. 7 and 8 illustrate presentations on a graphical user interface (GUI) video display for use by a session owner in monitoring and controlling access to a desktop computer by other viewers, or users, of a VNC session in accordance with one aspect of the present invention.
Figure 8:
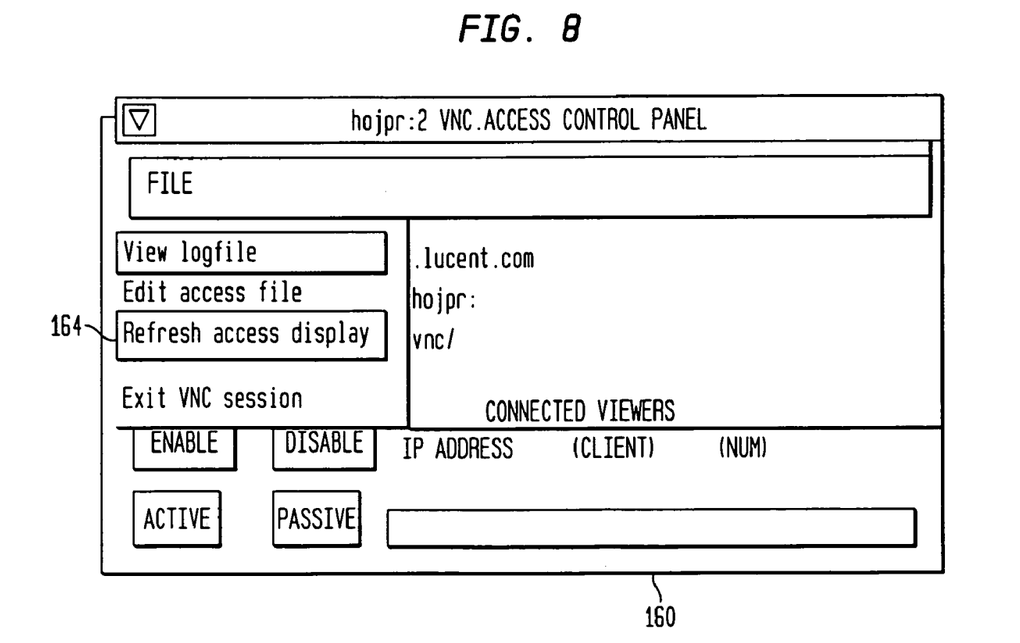

The Access Control Panel application 46 provides and maintains the GUI display shown in FIGS. 7 and 8 for the VNC session owner indicating status of VNCVIEWERS 32, 34 which have connected or disconnected from the VNC session. The VNCSESSION owner uses the GUI display to select the connection mode for each connected VNCVIEWER. The connection mode choices are either active or passive. If a connecting VNCVIEWER is provided active status, its Internet protocol (IP) address is stored in an access control file 48 by the Access Control Panel application 46. The security enhanced XVNC application 38 monitors the access control file 48 for added and deleted IP addresses. When an IP address is added to the address control file 48, the VNCVIEWER application associated with it is automatically provided with an active status. If an IP address is removed, or deleted, from the access control file 48, the VNCVIEWER application associated with the deleted IP address is changed from active to passive status. An active VNCVIEWER can observe as well as initiate activity in the VNCSESSION desktop. A passive VNCVIEWER can merely observe the activity of other viewers in the VNCSESSION.

After the VNCDAEMON application 44 is created as step 72, VNCSESSION proceeds to step 74 and executes a continuing loop in waiting for the session owner's viewer to terminate the VNC session. After the session owner's viewer terminates the VNC session as detected at step 74, the program proceeds to step 76 for terminating the VNC-SERVER application which ends the VNC session. The program then proceeds to step 78 for cleaning up the VNCSESSION application, including terminating the VNCDAEMON application. This is followed by termination of the VNCSESSION application at step 80.

Figure 4:
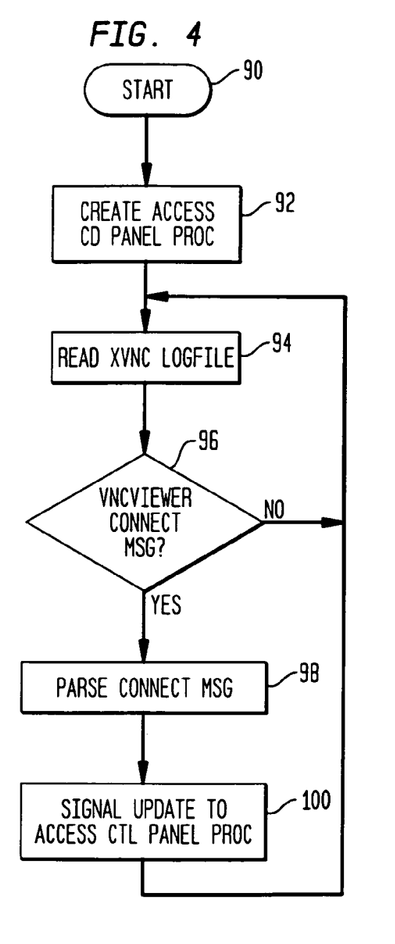
FIG. 4 is a simplified flow chart illustrating the sequence of steps involved in monitoring by the session owner of a VNC viewer requesting connection with the VNCSESSION.

Referring to FIG. 4, there is shown a simplified flow chart illustrating the steps involved in the VNCDAEMON application. As indicated earlier, the VNCDAEMON application is invoked by the VNCSESSION application at step 72. The VNCDAEMON application is started at step 90, and proceeds to step 92 for creating the access control panel procedure for presenting the access control panel 46 on the GUI for use by the VNCSESSION owner. After creating the access control panel, the VNCDAEMON application proceeds to step 94 for reading the content of the XVNC log file 42. The VNCDAEMON application then proceeds to step 96 for monitoring for VNCVIEWER connect or disconnect messages from the log file 42. The VNCDAEMON application then executes a loop looking for a VNCVIEWER connect or disconnect message until a connect or disconnect message is detected at step 96, whereupon the VNCDAEMON application proceeds to step 98 for parsing the connect or disconnect message. At step 98, the VNCDAEMON application processes the message to determine if it is a connect or disconnect message and then proceeds to step 100 for updating the information presented on the access control panel 46 for the session owner. The VNCDAEMON application then returns to step 94 for again reading the contents of the XVNC log file and again monitoring for VNCVIEWER connect and disconnect messages from the log file 42.

Figure 5:
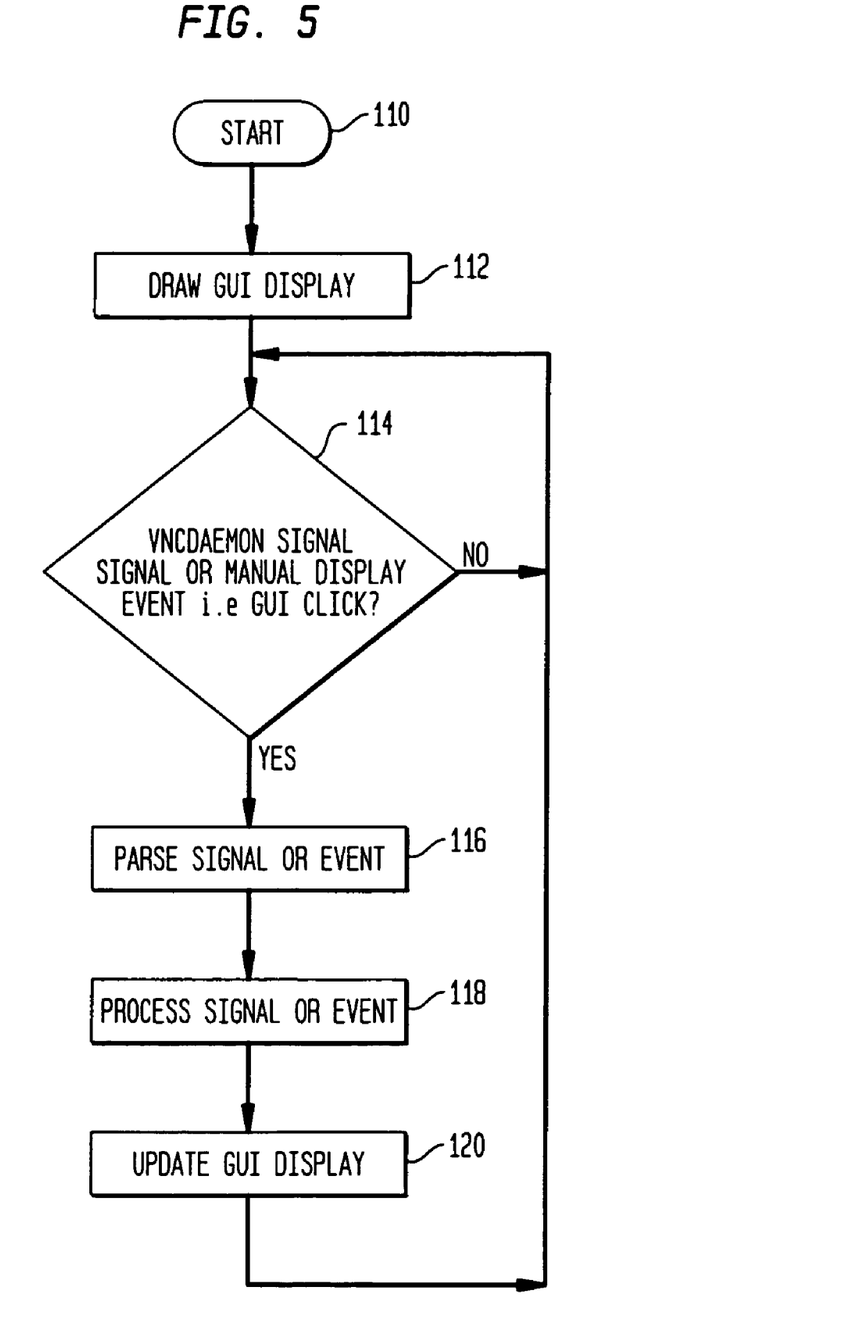
FIG. 5 is a simplified flow chart illustrating the sequence of steps involved in providing an access control panel video display for use by a VNCSESSION owner indicating the status of VNC viewers which have connected to or disconnected from the VNCSESSION.

Referring to FIG. 5, there is shown a simplified flow chart of the steps involved in the access control panel GUI display application which is created by the VNCDAEMON application at step 92. The access control panel GUI display application starts at step 110 and proceeds to step 112 for presenting the GUI display on the session owner's desktop computer. The access control panel GUI display application then proceeds to step 114 and looks for either a VNCDAEMON signal indicating a viewer connect or disconnect or a manual input at the GUI display by the session owner. The access control panel GUI display application executes a loop at step 114 until either a VNCDAEMON signal or a manual display event initiated by the session owner is detected. Once either a VNCDAEMON signal or a manual display event is detected at step 114, the access control panel GUI display application proceeds to step 116 for parsing the signal or event. For example, the application determines if a session owner initiated a manual display event such as assigning an active or inactive status to a viewer. The access control panel GUI display application then proceeds to step 118 for processing the signal or event such as updating the access control file regarding a particular viewer or user. The access control panel GUI display application then at step 120 updates the GUI display in presenting the latest VNCDAEMON signal information or owner initiated manual display event on the GUI display.

Referring to FIG. 6, there is shown a simplified flow chart illustrating the steps involved in carrying out the security enhanced XVNC application. The security enhancements for the XVNC application start at step 130 and proceed to step 132 for granting WRITE access to the VNCSESSION owner's VNCVIEWER. Thus, the first viewer in the VNC system is designated as the session owner and is provided active status with respect to the software application in the desktop computer. The XVNC application then proceeds to step 134 and monitors for other viewers for connecting to the XVNC. If another viewer request is detected at step 134, the program proceeds to step 136 and provides that viewer with READ access. The XVNC application then proceeds to step 138 for updating an internal copy of the access control file for all VNCVIEWER permissions. If at step 134, the XVNC application does not detect any additional VNC viewer access requests, the program proceeds to step 140. At step 140, the XVNC application looks for VNCVIEWER WRITE requests. If no VNCVIEWER WRITE requests are detected at step 140, the XVNC application loops back to step 134 and again looks for a VNCVIEWER access request. If at step 140, a VNCVIEWER WRITE request is detected, the XVNC application proceeds to step 142 to determine if the access control file has been modified since the file was last reviewed. If the access control file has been modified since last reviewed, the XVNC application proceeds to step 144 and reads the new information into the access control file for updating all VNCVIEWER permissions. If at step 142, it is determined that the access control file has not been modified since last reviewed, the XVNC application proceeds to step 146 to determine if the VNCVIEWER has WRITE permission. If the VNCVIEWER has WRITE permission, the XVNC application proceeds to step 148 and allows the VNCVIEWER to WRITE inputs to the software application which is the subject of the VNCSESSION. If at step 146, it is determined that the VNCVIEWER does not have WRITE permission, the XVNC application proceeds to step 150 and denies WRITE access to the VNCVIEWER. The XVNC application then returns to step 134 for continuing to monitor for VNCVIEWER access requests.

Referring to FIGS. 7 and 8, there are shown presentations on a GUI display 160 for use by a VNC session owner in monitoring and controlling access to a desktop computer by other viewers, or users, of a VNC session in accordance with one aspect of the present invention. The GUI display 160 includes a File listing which allows for a pull-down menu for viewing the log file, editing the access file, and other control activities exercised by the session owner. The pull-down menu 164 is shown in FIG. 8 below the File listing and includes selections such as View log file, Edit access file, Refresh access display, and Exit VNC session. Below the File listing in the GUI display 160 shown in FIG. 7 are three lines of information for the session owner. These lines include VNC Server Host, VNC log file, and VNC access file. The VNC server host identifies the VNCSESSION computing platform. The VNC log file identifies the directory location of the log file, and the VNC access file identifies the directory location of the access file. Also shown are Master Enable and Master Disable selectors to permit the session owner to activate or deactivate all VNC viewers at the same time. Also shown are indicators regarding the connected viewers such as the IP address, client and number of viewers at that IP address viewing the VNC session. The GUI display 160 further includes ACTIVE and PASSIVE selectors for use by the session owner for providing individual viewers either in active or passive status. Next to the ACTIVE and PASSIVE selectors is the specific machine name of the desktop connected to the VNC session which only appears when the viewer connects to or disconnects from the VNC session. This information is detected and displayed under the control of the VNCDAEMON and access control panel applications as described above.

There has thus been shown a method for exercising dynamic IP-based control over access of viewers to the server of a shared desktop in a virtual network computing (VNC) system. In the VNC system, multiple users, or viewers, at different locations share a common desktop computer for the purpose of sharing control of software applications on the desktop. The user who opens the VNC-SESSION is termed the session owner and is given active access to the software application in terms of exercising control over the application. The session owner determines whether subsequent viewers have active status or passive status, wherein the viewer is permitted to only review desktop activity initiated by other viewers, but cannot initiate such activities themselves, i.e., cannot exercise control over the software application. The session owner can specify on a per viewer basis as well as on a per session basis, the level of access, active or passive, of each subsequent viewer.

While particular embodiments of the present invention have been shown and described, it will be obvious to those skilled in the relevant art that changes and modifications may be made without the parting from the invention in its broader aspects. Therefore, the aim in the appended claims is to cover all such changes and modifications as fall within the true spirit and scope of the invention. The matter set forth in the foregoing description in accompanying drawings is offered by way of illustration only and not as a limitation. The actual scope of the invention is intended to be defined in the following claims when viewed in their proper perspective based on the prior art.

We claim:

1. For use in a virtual network computing session wherein plural remotely located users connected together in a global information network share a software application in a server of a desktop computer, a method for controlling access of users to the software application, said method comprising the steps of:

assigning an identifying address for each of the users authorized for access to the software application;

storing in a file the identifying addresses of the users authorized for access to the software application;

receiving a request from one or more viewers for access to the software application, wherein each request includes an address identifying the requesting viewer;

comparing the address identifying the requesting viewer with said identifying addresses stored in said file during the virtual network computing session and providing simultaneous access to the software application for each of said viewers if the address identifying the requesting viewer is stored in said file or denying access if the address identifying the requesting viewer is not stored in said file, wherein access is provided or denied during the virtual network computing session and access to the software application includes WRITE access for permitting said user to exercise control over the software application and READ access for permitting said user only to view the exercise of control over the software application by other users, and wherein only identifying addresses of users authorized for WRITE access to the software application are stored in said file;

designating a first user of the virtual network computing session as a session owner and providing said session owner with WRITE access to the software application; and permitting the session owner to assign either WRITE or READ access to the software application to subsequent users of the virtual network computing session.

2. The method of claim 1 further comprising the step of permitting the session owner to change the WRITE or READ access to the software application previously assigned to any subsequent user of the virtual network computing session.

3. The method of claim 1 wherein said global information network comprises the Internet and said identifying address comprises an Internet Protocol address.

4. The method of claim 1 wherein the desktop computer includes a video display and the method further includes the step of presenting on the video display for the session owner information regarding viewers who have access to the software application.

5. The method of claim 4 wherein the step of presenting on the video display information regarding viewers who have access to the software application includes indicating if the viewer has active or passive access to the software application.

6. The method of claim 5 further comprising the step of presenting on the video display the number of viewers from a given identifying address who have been granted access to the software application.

7. The method of claim 1 further comprising the step of providing first and second selectors on said video display for allowing the session owner to grant access to the software application to all viewers or deny access to the software application to all viewers, respectively.

8. The method of claim 7 further comprising the step of providing a selector on said video display for each connected viewer.

9. A method for conducting a virtual network computing session wherein plural remotely located users connected together by a global information network share a software application on a server of a desktop computer, wherein the users are provided either active access for exercising control over the software application or passive access for only observing the exercise of control over the software application exercised by other users having active access, said method comprising the steps of:

assigning a first user of the software application with active access for exercising control over the software application and for monitoring the actions of subsequent users who have active access to the software application;

assigning an identifying address for each of the subsequent users;

storing in a file the identifying addresses of the subsequent users authorized for active access to the software application;

comparing addresses identifying each of plural viewers requesting access to the software application with the identifying addresses in said file and simultaneously granting said plural viewers active access if the viewer's identifying address is in said file;

permitting said first user of the software application to assign subsequent users with active and/or passive access to the software application and to change the access to the software application previously assigned to any subsequent users during the virtual network computing session; and allowing said first user to terminate the virtual network computing session and cancel the active and/or passive access of subsequent users to the software application.

10. The method of claim 9 wherein the desktop computer includes a video display and the method further comprises the step of presenting on the video display for the session owner information regarding viewers who have access to the software application.

11. The method of claim 10 wherein the step of presenting on the video display information regarding viewers who have access to the software application includes indicating that the viewer has active or passive access to the software application.

12. The method of claim 11 further comprising the step of presenting on the video display the number of viewers from a given identifying address who have been granted access to the software application.

13. The method of claim 11 further comprising the step of providing first and second selectors in said video display for allowing the session owner to grant access to the software application to all viewers or deny access to the software application to all viewers, respectively.

14. The method of claim 9 further comprising the step of assigning a password for use by subsequent viewers requesting access to the software application.

15. The method of claim 14 wherein the first user assigns the password and disseminates said password to subsequent users having active and/or passive access to the software application.

* * * * *